United States Patent
Jiang et al.

(10) Patent No.: US 12,273,004 B2
(45) Date of Patent: Apr. 8, 2025

(54) MOTOR AND DRIVER INCLUDING MOTOR

(71) Applicant: GUANGDONG ZHAOQING L&V CO. LTD., Guangdong (CN)

(72) Inventors: Yuan Jiang, Guangdong (CN); Huoming Li, Guangdong (CN); Xianghuai Qiu, Guangdong (CN); Weiyan Xu, Guangdong (CN)

(73) Assignee: GUANGDONG ZHAOQING L&V CO. LTD., Guangdong (CN)

( * ) Notice: Subject to any disclaimer, the term of this patent is extended or adjusted under 35 U.S.C. 154(b) by 241 days.

(21) Appl. No.: 17/758,794

(22) PCT Filed: Jan. 12, 2021

(86) PCT No.: PCT/CN2021/071296
§ 371 (c)(1),
(2) Date: Jul. 13, 2022

(87) PCT Pub. No.: WO2021/143679
PCT Pub. Date: Jul. 22, 2021

(65) Prior Publication Data
US 2023/0041367 A1     Feb. 9, 2023

(30) Foreign Application Priority Data
Jan. 14, 2020   (CN) .......................... 202010034646.7

(51) Int. Cl.
*H02K 5/15*     (2006.01)
*H02K 7/08*     (2006.01)
*H02K 7/116*    (2006.01)

(52) U.S. Cl.
CPC .............. *H02K 5/15* (2013.01); *H02K 7/083* (2013.01); *H02K 7/116* (2013.01)

(58) Field of Classification Search
CPC .... H02K 11/215; H02K 7/116; H02K 5/1672; H02K 5/15; H02K 7/083; H02K 5/04; H02K 5/00
(Continued)

(56) References Cited

U.S. PATENT DOCUMENTS

| | | | |
|---|---|---|---|
| 4,655,099 A * | 4/1987 | Hansen | F16H 57/0006 248/606 |
| 2012/0133223 A1* | 5/2012 | Liu | H02K 9/14 310/64 |
| 2019/0273421 A1* | 9/2019 | Velderman | B23B 45/02 |

FOREIGN PATENT DOCUMENTS

| CN | 202652043 U | 1/2013 |
|---|---|---|
| CN | 206272423 U | 6/2017 |

(Continued)

OTHER PUBLICATIONS

Lim Martin, Motor Reduction Box Machine, Dec. 1, 2017, CN 107425653 (English Machine Translation) (Year: 2017).*
(Continued)

*Primary Examiner* — Alexander A Singh
(74) *Attorney, Agent, or Firm* — Michael Best & Friedrich LLP

(57) ABSTRACT

The present invention relates to a motor, comprising: a motor housing, a cavity being formed inside the motor housing, a stator assembly and a rotor assembly being accommodated in the cavity, two ends of the motor housing being provided with an opening; an end cover, the end cover being arranged at one side of the motor housing and used for sealing the opening at said side; a flange portion, the flange portion sealing the opening at the other side of the motor housing; the rotor assembly is provided with a rotor shaft, one end of the rotor shaft passing through the end cover, the other end passing through the flange portion; a magnetic ring, the magnetic ring being arranged on the rotor shaft and
(Continued)

located at the side of the end cover away from the motor housing; output teeth, the output teeth being arranged on the rotor shaft and located at the side of the flange portion away from the motor housing. The present invention reduces rotor gear parts, connects the motor and a gear box by means of the flange portion, decreases the length size, increases the degree of concentricity of the motor and the gear box, improves driver installation efficiency, and saves installation costs.

8 Claims, 4 Drawing Sheets

(58) Field of Classification Search
USPC .......................................... 310/83, 99, 89, 90
See application file for complete search history.

(56) References Cited

FOREIGN PATENT DOCUMENTS

| CN | 107425653 | A | * | 12/2017 | | |
|----|-----------|---|---|---------|---|---|
| CN | 208845648 | U | | 5/2019 | | |
| CN | 209896844 | U | | 1/2020 | | |
| CN | 111082592 | A | | 4/2020 | | |
| JP | 2001190042 | A | * | 7/2001 | ......... | F16H 57/0428 |
| KR | 20100019648 | A | | 2/2010 | | |
| KR | 1020170076116 | A | * | 7/2017 | | |
| KR | 20180027347 | | * | 3/2018 | | |

OTHER PUBLICATIONS

Saito et al., Motor, Mar. 14, 2018, KR 20180027347 (English Machine Translation) (Year: 2018).*

Jang et al, Driving Apparatus for Washing Machine, Jul. 4, 2017, KR 20170076116 (English Machine Translation) (Year: 2017).*

Kimura Kiyoshi, Lubricating Structure for Rotor Bearing of Electric Motor, Jul. 10, 2001, JP 2001190042 (English Machine Translation) (Year: 2001).*

International Search Report and Written Opinion for Application No. PCT/CN2021/071296 dated May 10, 2021 (14 pages, including an English translation).

International Preliminary Report on Patentability for Application No. PCT/CN2021/071296 dated Jul. 19, 2022 (11 pages, including an English translation).

* cited by examiner

MOTOR AND DRIVER INCLUDING MOTOR

TECHNICAL FIELD

The present invention relates to the field of mechanical transmission, more particularly, to a motor and a driver including the motor.

BACKGROUND ART

In the field of mechanical transmission, motors are commonly used power sources to provide rotational power output. The motor can directly drive the terminal part to rotate, or a gearbox can be connected to the output end of the motor to change the rotation speed of the motor and then transmit the power to the terminal part.

In the existing motor-gearbox connection structure, one end of the motor is provided with a motor end cover by means of riveting, and the motor and the gearbox flange plate are generally fixedly connected by a threaded connection device.

In this structure, the motor and the flange plate are separate components. As a result, the driver is too long after the motor and the gearbox are connected, and the installation is also very complicated.

SUMMARY OF THE INVENTION

In order to solve the above technical problem to a certain extent, the present invention proposes the following technical solution:

A motor comprises motor housing, a cavity being formed inside the motor housing, a stator assembly and a rotor assembly being accommodated in the cavity, each end of the motor housing being provided with an opening; an end cover, the end cover being arranged at one side of the motor housing and used for sealing the opening at said side; a flange portion, the flange portion sealing the opening at the other side of the motor housing; wherein the rotor assembly is provided with a rotor shaft, one end of the rotor shaft passing through the end cover, the other end passing through the flange portion. The motor further comprises a magnetic ring, the magnetic ring being arranged on the rotor shaft and located at the side of the end cover away from the motor housing; and output teeth, the output teeth being arranged on the rotor shaft and located at the side of the flange portion away from the motor housing.

According to one aspect of the present invention, the magnetic ring and the output teeth are arranged on the rotor shaft by means of riveting.

According to one aspect of the present invention, an axial end surface of the end cover is provided with a boss that abuts against an end surface of the magnetic ring, and an axial end surface of the flange portion is provided with a boss that abuts against an end surface of the output teeth.

According to one aspect of the present invention, a hole is provided near an opening edge of the motor housing, wherein the hole produces a metal rib on the motor housing, and the end cover and the flange portion are respectively provided with elongated grooves.

According to one aspect of the present invention, a gasket is arranged between the output teeth and the bearing for supporting the rotor shaft near the output teeth.

According to one aspect of the present invention, a gasket is arranged between the magnetic ring and the bearing for supporting the rotor shaft near the magnetic ring.

In addition, the present application relates to a driver comprises a gearbox and the above-mentioned motor.

According to one aspect of the present invention, the gearbox comprises a gearbox housing, and the flange portion of the motor is connected with the motor housing and the gearbox housing.

According to one aspect of the present invention, the flange portion and the
gearbox housing are welded by laser. The motor obtained from the above technical solution can reduce the number of rotor gear parts, thereby saving costs, and with a flange portion connected with the motor and the gearbox, it can shorten the length dimension, improve the concentricity between the motor and the gearbox, improve the installation efficiency of the driver, and save the installation cost.

The motor and the driver of the present invention can be applied to the adjustment of, e.g. the tailgate, the sunroof, and the seating level/height/tilt angle of the automobile.

BRIEF DESCRIPTION OF THE DRAWINGS

Exemplary embodiments of the present invention are described with reference to the accompanying drawings, in which.

Figure 1:
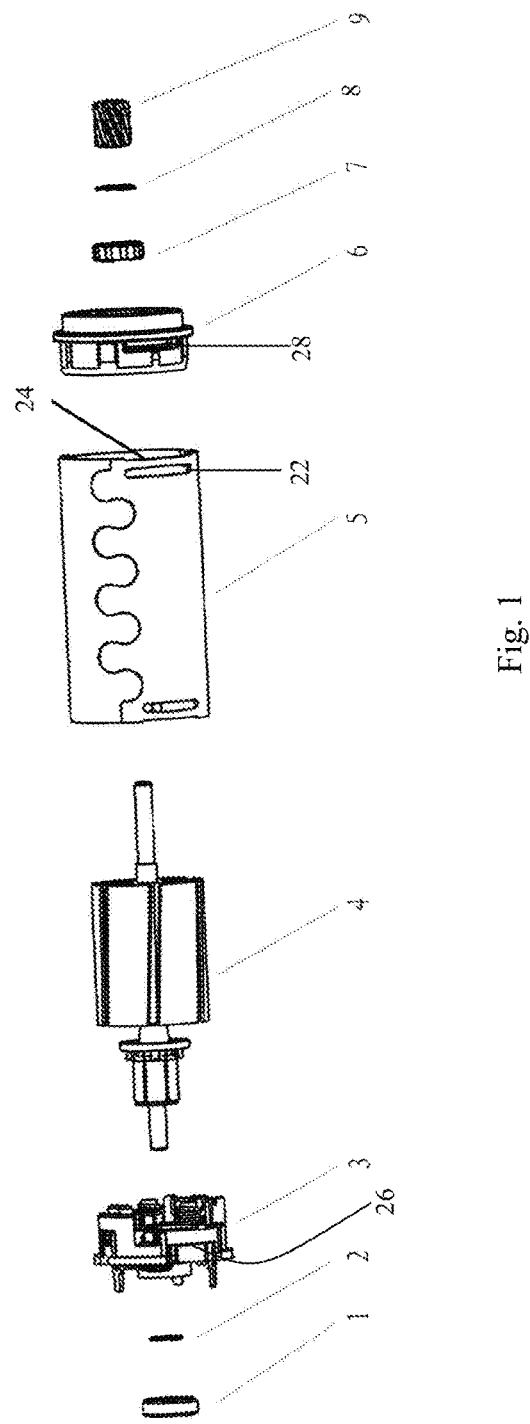
FIG. 1 is an exploded view of the motor of the present invention.

All the accompanying drawings are only schematic and are not necessarily drawn to scale. In addition, the drawings only show the essential parts to illustrate the present invention, and other parts are omitted or only mentioned. That is, the present invention may also include other components in addition to those shown in the drawings.

DETAILED DESCRIPTION OF THE EMBODIMENTS

The technical solution of the present invention is described in detail below in combination with the accompanying drawings.

The motor of the present invention is described with reference to FIGS. 1, 2 and 3. The motor of the present invention comprises a motor housing 5, a cavity being formed inside the motor housing 5, and a stator assembly, a rotor assembly 4, etc. being accommodated in the cavity. The housing may have various shapes, such as cylindrical shape, prismatic shape, and the like. In the schematic embodiment shown in FIG. 1, the housing 5 has a cylindrical structure. Both ends of the housing 5 have openings, one end is closed by the end cover 3, and the other end is closed by the flange portion 6.

The rotor assembly 4 comprises a rotor shaft, one end of which passes through the end cover 3 and is supported in the end cover 3, for example, by a bearing 10, and the other end of which passes through the flange portion 6 and is supported in the flange portion 6, for example, by a bearing 7. The rotor shaft is provided with a connection section connected with a gearbox, the connection section being shown in the form of output teeth 9 in FIG. 1. Preferably, a gasket 8 is provided between the output tooth 9 and the bearing 7.

In addition, a magnetic ring 1 is arranged outside the end cover 3 of the motor. Preferably, a gasket 2 is provided between the magnetic ring 1 and the bearing 10.

Figure 3:
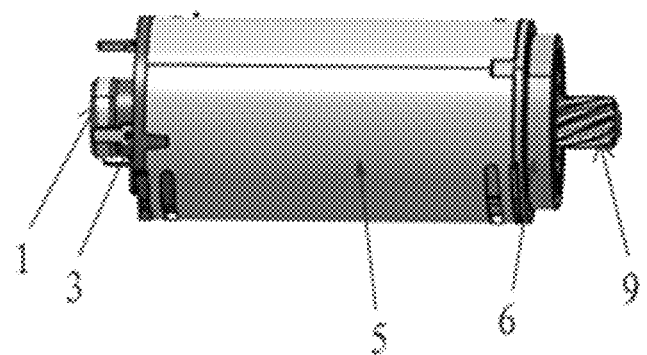
FIG. 3 is a schematic diagram of the motor of the present invention after assembly.

As can be seen from FIGS. 1 and 3, as a feasible embodiment, the motor end cover 3 and the flange portion 6 are both fixedly arranged on the motor housing 5. A hole 22 is arranged near the edge of the opening of the motor housing 5, and the hole 22 produces a metal rib 24 on the motor housing 5. Correspondingly, the motor end cover 3 and the flange portion 6 are provided with respective elongated grooves 26, 28. During assembly, the rib 24 on the motor housing 5 is riveted and pressed into the groove 28, so that the motor end cover 3 and the flange portion 6 are clamped and fixed at both ends of the motor housing 5.

Further, the magnetic ring 1 and the output teeth 9 respectively arranged at corresponding end of the motor rotor shaft can be firmly connected to the rotor shaft by, for example, riveting. In order to prevent the axial movement of the rotor shaft, on the one hand, a boss is arranged on an axial end face of the motor end cover 3, and the end face of the boss is butted against the end face of the magnetic ring 1, so as to limit the axial movement of the rotor shaft in one direction; on the other hand, the axial end face of the flange portion 6 is also provided with a boss 44, and the end face of the boss 44 is butted against the end face of the bearing 7, thereby restricting the movement of the rotor shaft in the other axial direction. Therefore, presences of the magnetic ring 1 and the output teeth 9 can axially fix the rotor shaft.

Figure 2:
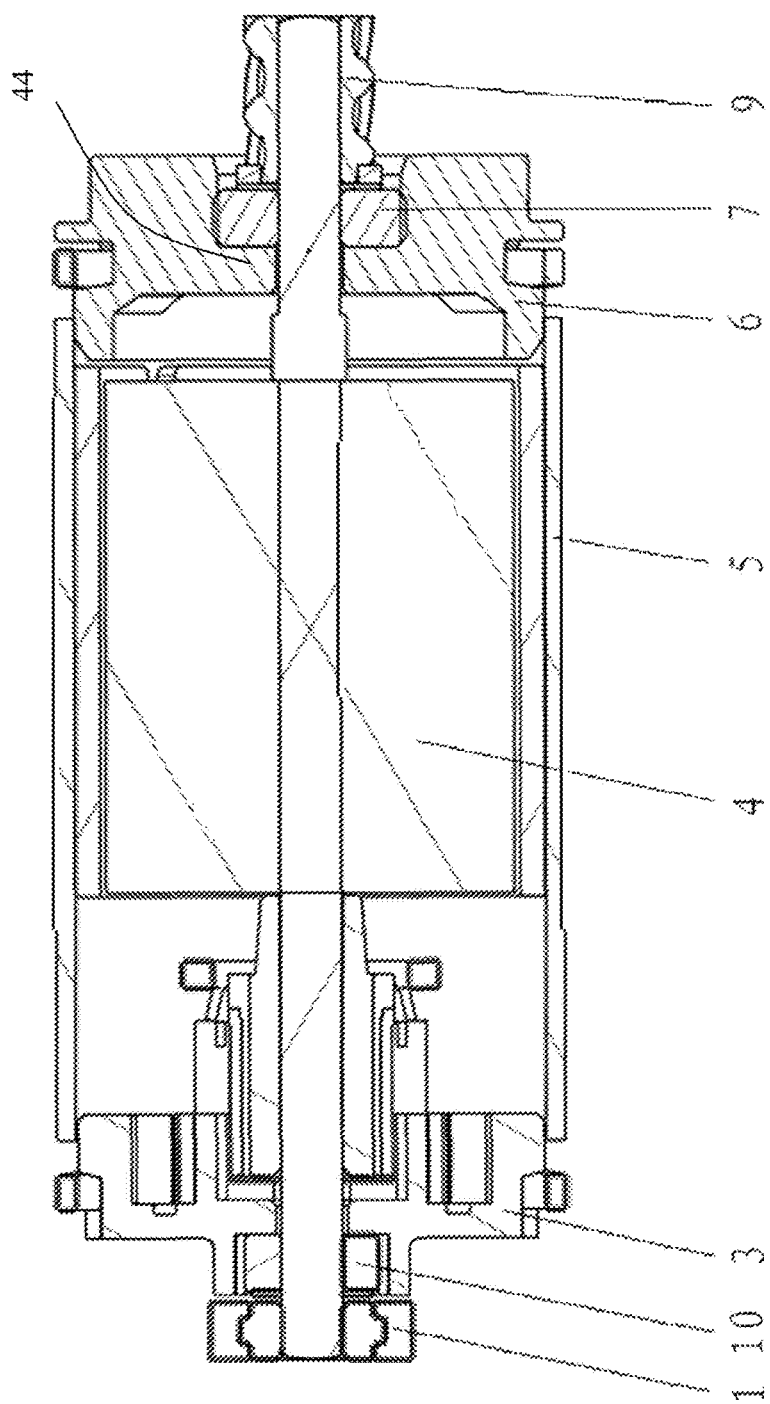
FIG. 2 is a sectional view of the motor of the present invention.

The structure of the motor in the present invention has been described in detail above in combination with FIGS. 1 to 3. The following describes the structures of the gearbox adapted to the present invention and the driver comprising the motor of the present invention in combination with FIGS. 4-5.

Figure 4:
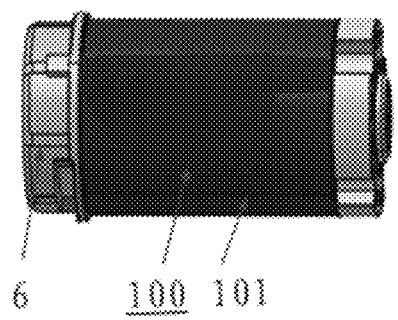
FIG. 4 is a schematic diagram of a gearbox adapted to the motor of the present invention.

Referring to FIG. 4, as a schematic illustration, the gearbox 100 adapted to the motor of the present invention comprises a gearbox housing 101. FIG. 4 shows a state in which the flange portion 6 of the motor is assembled with the gearbox housing 101. A gear transmission mechanism is contained in the gearbox housing 101. Since the specific structure of the gear transmission mechanism is not the focus of the present invention, it will not be discussed in detail here. Preferably, the gearbox housing 101 may be made of plastic material. The flange portion 6 can also be made of plastic material, and apparently, other suitable materials, such as stainless steel, can also be used. The two ends of the flange portion 6 are respectively connected with the gearbox housing 101 of the gearbox 100 and the motor housing 5.

As a preferred embodiment, the flange portion 6 is connected to the gearbox housing 101 of the gearbox 100 by laser welding.

Figure 5:
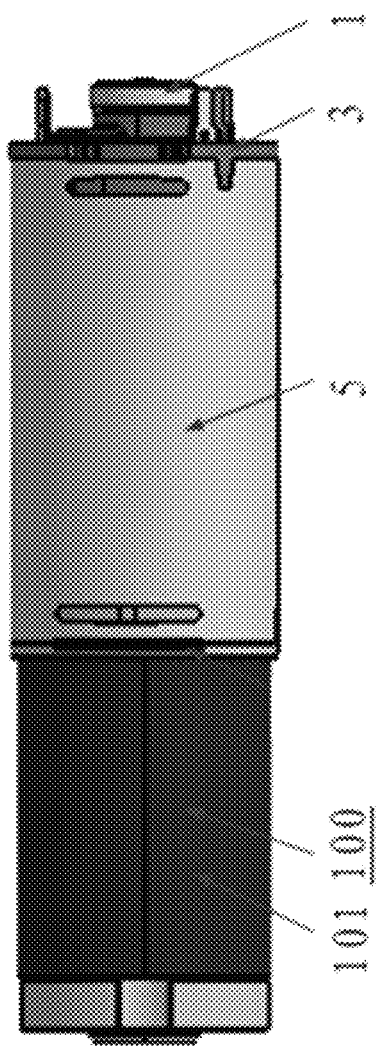
FIG. 5 is a schematic diagram of the driver after assembly of the motor and the gearbox of the present invention.

FIG. 5 shows the structure after assembly of the motor and the gearbox in the present invention. The motor and the gearbox 100 are connected together through the flange portion 6. The motor output teeth 9 assembled on the rotor shaft of the motor mesh with the input gear of the gearbox 100 to output the rotary power of the motor to the gearbox 100. The two form an integral driver to output power.

The present invention has been clearly and completely described with reference to the above schematic embodiments. It should be understood by those skilled in the art that various other embodiments can be envisaged by modifying the disclosed technical solution without departing from the spirit and scope of the present invention. These embodiments should be understood as falling within the scope determined by the present invention based on the claims and any equivalent technical solution thereof.

What is claimed is:

1. A motor comprising:
   a motor housing having a cavity formed therein, wherein each end of the motor housing has an opening;
   a rotor assembly positioned in the cavity;
   an end cover arranged at one end of the motor housing and configured to seal the opening at the one end;
   a flange portion configured to seal the opening at the other end of the motor housing;
   wherein the rotor assembly includes a rotor shaft, one end of which passes through the end cover and is supported by a first bearing, the other end of which passes through the flange portion and is supported by a second bearing;
   wherein a magnetic ring is positioned on the rotor shaft and located at a side of the end cover away from the motor housing;
   wherein output teeth are positioned on the rotor shaft and located at a side of the flange portion away from the motor housing; and
   wherein a hole near an opening edge of the motor housing presents a metal rib on the motor housing, and the flange portion includes an elongated groove.

2. The motor of claim 1, wherein the magnetic ring and the output teeth are riveted to the rotor shaft.

3. The motor of claim 1, wherein a gasket is positioned between the output teeth and the second bearing.

4. The motor of claim 1, wherein a gasket is positioned between the magnetic ring and the first bearing.

5. A driver comprising a gearbox and the motor of claim 1.

6. The driver of claim 5, wherein the gearbox includes a gearbox housing, and wherein the flange portion of the motor is coupled to the motor housing and the gearbox housing.

7. The driver of claim 6, wherein the flange portion and the gearbox housing are welded by laser.

8. The driver of claim 1, wherein the end cover includes an elongated groove.

* * * * *